US011955270B2

(12) United States Patent
Shin et al.

(10) Patent No.: US 11,955,270 B2
(45) Date of Patent: Apr. 9, 2024

(54) COIL COMPONENT

(71) Applicant: SAMSUNG ELECTRO-MECHANICS CO., LTD., Suwon-si (KR)

(72) Inventors: Sung Sik Shin, Suwon-si (KR); Jae Wook Lee, Suwon-si (KR); Sung Young Jo, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 0 days.

(21) Appl. No.: 18/142,808

(22) Filed: May 3, 2023

(65) Prior Publication Data

US 2023/0298806 A1 Sep. 21, 2023

Related U.S. Application Data

(63) Continuation of application No. 16/898,877, filed on Jun. 11, 2020, now Pat. No. 11,842,843.

(30) Foreign Application Priority Data

Dec. 26, 2019 (KR) ........................ 10-2019-0175161

(51) Int. Cl.
*H01F 27/29* (2006.01)
*H01F 27/28* (2006.01)
(Continued)

(52) U.S. Cl.
CPC ......... *H01F 27/29* (2013.01); *H01F 27/2804* (2013.01); *H01F 27/32* (2013.01);
(Continued)

(58) Field of Classification Search
CPC ...... H01F 27/29; H01F 27/2804; H01F 27/32; H01F 41/041; H01F 41/12; H01F 2027/2809
(Continued)

(56) References Cited

U.S. PATENT DOCUMENTS 10,600,546 B2 * 3/2020 Choi ...................... A44B 11/04
2016/0268038 A1 9/2016 Choi
(Continued)

FOREIGN PATENT DOCUMENTS

CN 108288536 A 7/2018
CN 110310814 A 10/2019
(Continued)

OTHER PUBLICATIONS

Office Action issued in corresponding Korean Application No. 10-2019-0175161 dated Mar. 5, 2021, with English translation.
(Continued)

*Primary Examiner* — Suresh Memula
(74) *Attorney, Agent, or Firm* — MORGAN, LEWIS & BOCKIUS LLP

(57) ABSTRACT

A coil component includes a body having one surface and the other surface, opposing each other in one direction, and one end surface connecting the one surface and the other surface to each other, a support substrate embedded in the body, a coil portion disposed on the support substrate and including a lead-out pattern exposed from the one end surface, a first insulating layer disposed on the one end surface and having one region and the other regions spaced apart from each other in the other direction crossing the one direction, an external electrode having a connection portion, disposed between the one region and the other region to be connected to the lead-out pattern, and an extension portion extending from the connection portion to the one surface,
(Continued)

1000 and a second insulating layer disposed on the one end surface to cover the first insulating layer and the connection portion.

7 Claims, 6 Drawing Sheets

(51) Int. Cl.
*H01F 27/32* (2006.01)
*H01F 41/04* (2006.01)
*H01F 41/12* (2006.01)

(52) U.S. Cl.
CPC ........... *H01F 41/041* (2013.01); *H01F 41/12* (2013.01); *H01F 2027/2809* (2013.01)

(58) Field of Classification Search
USPC .......................................................... 336/192
See application file for complete search history.

(56) References Cited

U.S. PATENT DOCUMENTS

| | | | | |
|---|---|---|---|---|
| 2018/0197672 | A1* | 7/2018 | Kim | H01F 27/2804 |
| 2018/0286561 | A1* | 10/2018 | Shimoichi | H01F 41/10 |
| 2019/0066908 | A1* | 2/2019 | Ueda | H01F 17/0013 |
| 2019/0304671 | A1 | 10/2019 | Yang et al. | |
| 2019/0304672 | A1 | 10/2019 | Kang et al. | |
| 2019/0311829 | A1 | 10/2019 | Kang et al. | |
| 2019/0333679 | A1* | 10/2019 | Lee | H01F 27/2804 |
| 2019/0333687 | A1 | 10/2019 | Yang et al. | |
| 2019/0362887 | A1* | 11/2019 | Yang | H01F 27/292 |
| 2020/0027643 | A1* | 1/2020 | Kim | H01F 27/292 |
| 2020/0098506 | A1* | 3/2020 | Hamada | H01F 27/32 |
| 2020/0105456 | A1* | 4/2020 | Kim | H01F 27/292 |
| 2020/0168386 | A1* | 5/2020 | Jung | H01F 41/042 |
| 2020/0194167 | A1* | 6/2020 | Lee | H01F 27/292 |
| 2020/0335253 | A1* | 10/2020 | Yeo | H01F 27/2852 |

FOREIGN PATENT DOCUMENTS

| | | | | | |
|---|---|---|---|---|---|
| CN | 110323045 | A | | 10/2019 | |
| CN | 110400671 | A | | 11/2019 | |
| CN | 110993278 | A | | 4/2020 | |
| CN | 110993278 | A | * | 4/2020 | H01F 17/04 |
| CN | 111916279 | A | * | 11/2020 | H01F 17/0013 |
| CN | 111916279 | A | | 11/2020 | |
| CN | 10-2021-0000164 | A | | 1/2021 | |
| CN | 108288536 | B | * | 1/2021 | H01F 17/0013 |
| CN | 112002515 | B | | 4/2022 | |
| CN | 112002515 | B | * | 4/2022 | H01F 17/0013 |
| KR | 10-2015-0089279 | A | | 8/2015 | |
| KR | 10-2016-0108935 | A | | 9/2016 | |
| KR | 10-2016499 | B1 | | 9/2019 | |
| KR | 20210000164 | A | * | 1/2021 | |
| KR | 10-2222609 | B1 | | 3/2021 | |
| KR | 102222609 | B1 | * | 3/2021 | |

OTHER PUBLICATIONS

Office Action issued in corresponding U.S. Appl. No. 16/898,877 dated Apr. 26, 2023.
Office Action issued in corresponding Chinese Patent Application No. 202010794023.X dated Dec. 9, 2023, with English translation.

* cited by examiner

COIL COMPONENT

CROSS-REFERENCE TO RELATED APPLICATION(S)

This application is the continuation application of U.S. patent application Ser. No. 16/898,877 filed on Jun. 11, 2020, which claims the benefit under 35 USC 119(a) of Korean Patent Application No. 10-2019-0175161 filed on Dec. 26, 2019 in the Korean Intellectual Property Office, the entire disclosures of which are incorporated herein by reference for all purposes.

TECHNICAL FIELD

The present disclosure relates to a coil component.

BACKGROUND

Description of Related Art

An inductor, a coil component, is a typical passive electronic component used in electronic devices, along with a resistor and a capacitor.

With the recent trend for high performance and miniaturization of electronic devices, electronic components used in the electronic devices have been increasing in number and decreasing in size.

When an external electrode is formed by a plating process to miniaturize a coil component, the external electrode may extend to an unwanted location, other than a target formation location, due to plating bleeding.

SUMMARY

An aspect of the present disclosure is to provide a coil component, capable of reducing plating bleeding of an external electrode while maintaining connectivity between a coil portion and the external electrode.

According to an aspect of the present disclosure, a coil component includes a body having one surface and the other surface, opposing each other in one direction, and one end surface connecting the one surface and the other surface to each other, a support substrate embedded in the body, a coil portion disposed on the support substrate and including a lead-out pattern exposed from the one end surface of the body, a first insulating layer disposed on the one end surface of the body and having one region and the other regions spaced apart from each other in the other direction crossing the one direction, an external electrode having a connection portion, disposed between the one region and the other region to be connected to the lead-out pattern, and an extension portion extending from the connection portion to the one surface of the body, and a second insulating layer disposed on the one end surface of the body to cover the first insulating layer and the connection portion.

BRIEF DESCRIPTION OF DRAWINGS

The above and other aspects, features, and advantages of the present disclosure will be more clearly understood from the following detailed description, taken in conjunction with the accompanying drawings.

DETAILED DESCRIPTION

Figure 1:
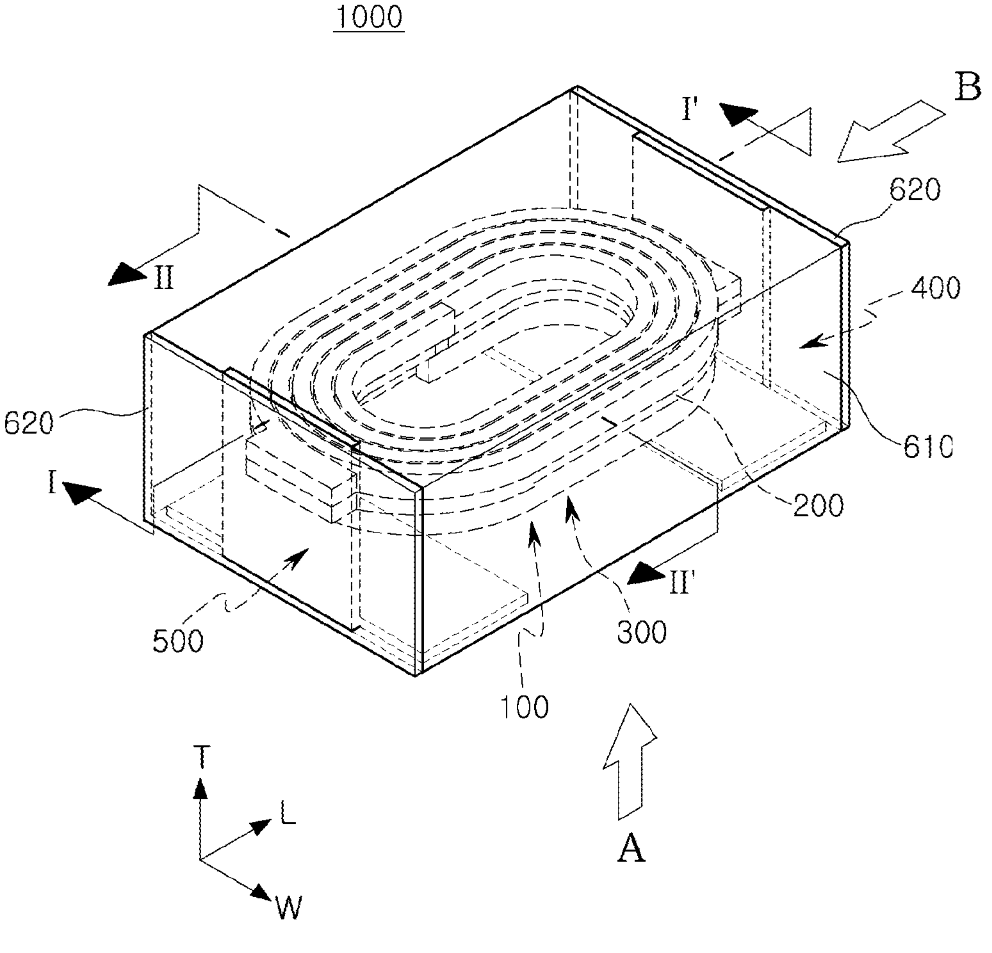
FIG. 1 is a schematic view of a coil component according to an example embodiment of the present disclosure.

The terms used in the description of the present disclosure are used to describe a specific embodiment and are not intended to limit the present disclosure. A singular term includes a plural form unless otherwise indicated. The terms “include,” “comprise,” “is configured to,” etc. of the description of the present disclosure are used to indicate the presence of features, numbers, steps, operations, elements, parts, or combination thereof, and do not exclude the possibilities of combination or addition of one or more additional features, numbers, steps, operations, elements, parts, or combination thereof. Also, the terms “disposed on,” “positioned on,” and the like, may indicate that an element is positioned on or beneath an object, and does not necessarily mean that the element is positioned above the object with reference to a gravity direction.

The term “coupled to,” “combined to,” and the like, may not only indicate that elements are directly and physically in contact with each other, but also include the configuration in which another element is interposed between the elements such that the elements are also in contact with the other component.

Sizes and thicknesses of elements illustrated in the drawings are indicated as examples for ease of description, and the present disclosure are not limited thereto.

A value used to describe a parameter such as a 1-D dimension of an element including, but not limited to, “length,” “width,” “thickness,” “diameter,” “distance,” “gap,” and/or “size,” a 2-D dimension of an element including, but not limited to, “area” and/or “size,” a 3-D dimension of an element including, but not limited to, “volume” and/or “size”, and a property of an element including, not limited to, “roughness,” “density,” “weight,” “weight ratio,” and/or “molar ratio” may be obtained by the method(s) and/or the tool(s) described in the present disclosure. The present disclosure, however, is not limited thereto. Other methods and/or tools appreciated by one of ordinary skill in the art, even if not described in the present disclosure, may also be used.

In the drawings, an L direction is a first direction or a length (longitudinal) direction, a W direction is a second direction or a width direction, a T direction is a third direction or a thickness direction.

Hereinafter, a coil component according to an example embodiment of the present disclosure will be described in detail with reference to the accompanying drawings. Referring to the accompanying drawings, the same or corresponding components may be denoted by the same reference numerals and overlapped descriptions will be omitted.

In electronic devices, various types of electronic components may be used, and various types of coil components may be used between the electronic components to remove noise, or for other purposes.

In other words, in electronic devices, a coil component may be used as a power inductor, a high frequency (HF) inductor, a general bead, a high frequency (GHz) bead, a common mode filter, and the like.

Figure 2:
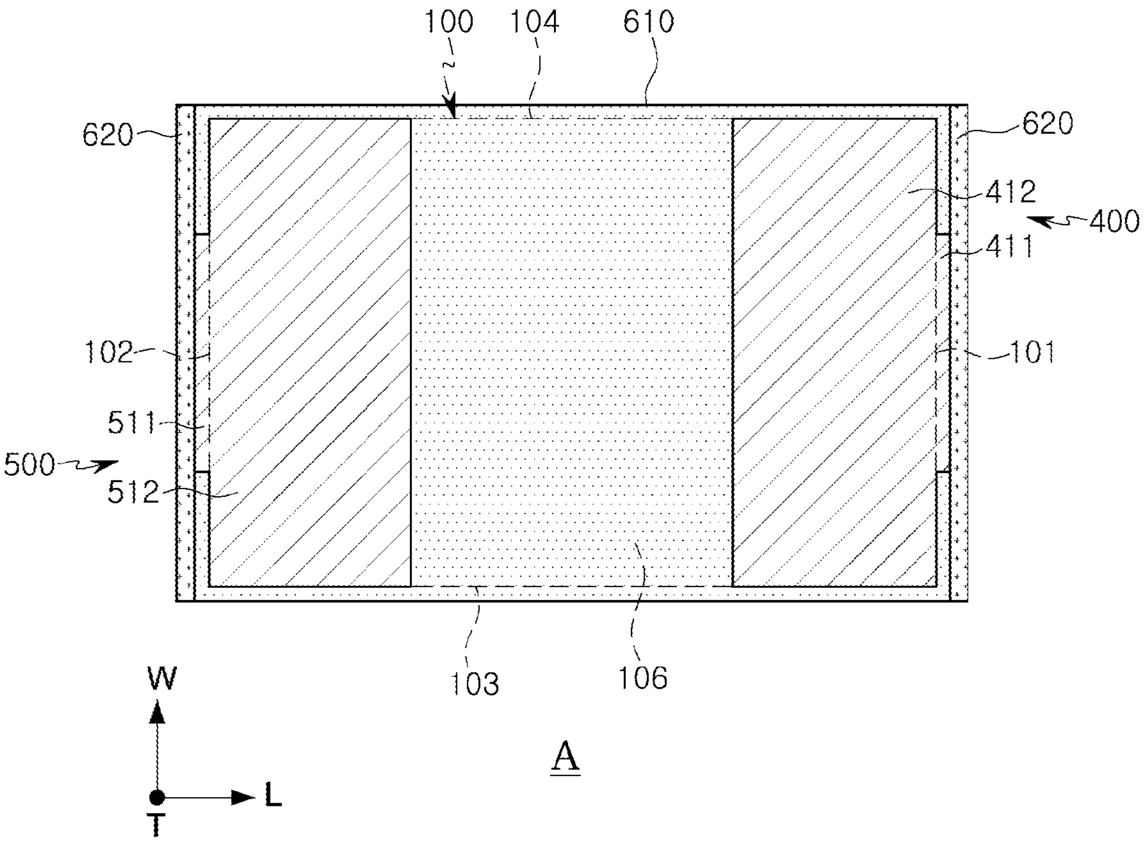
FIG. 2 is a view when viewed in direction A of FIG. 1.
Figure 3:
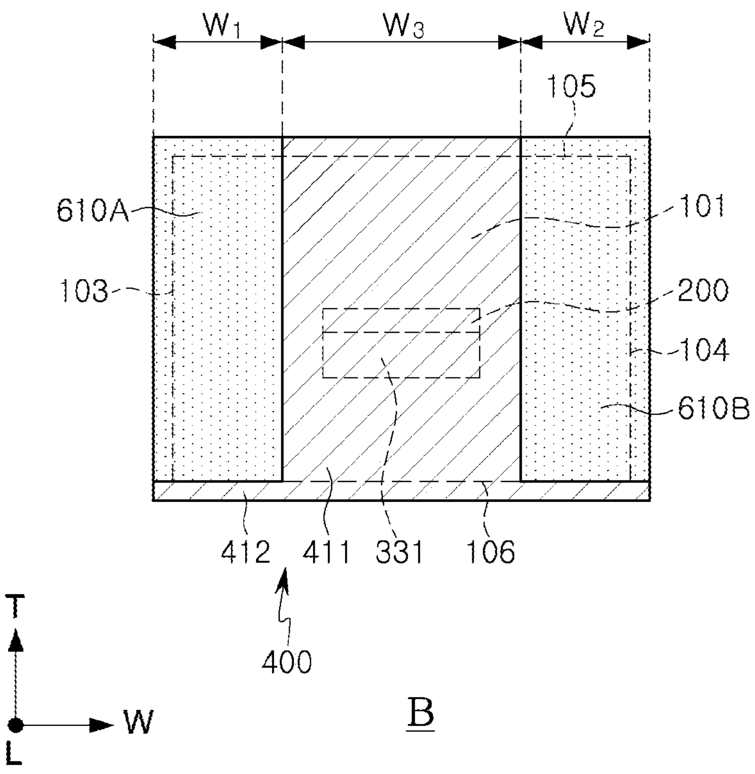
FIG. 3 is a view when viewed in direction B of FIG. 1.
Figure 4:
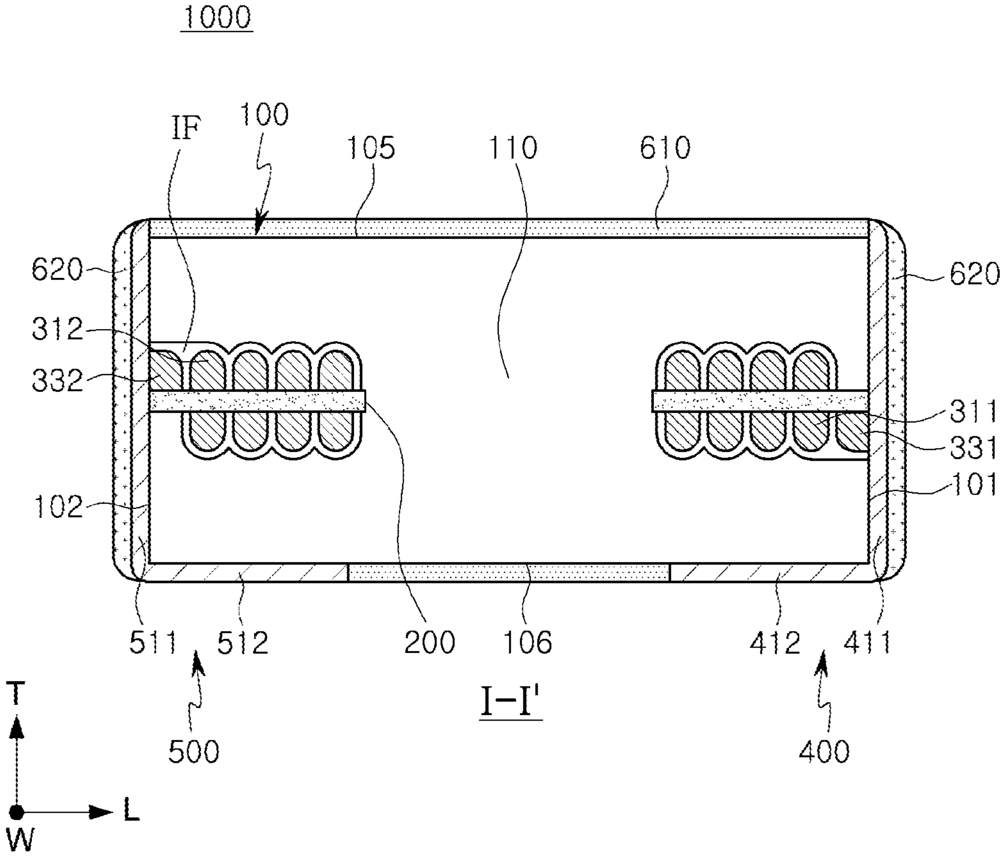
FIG. 4 is a cross-sectional view taken along line I-I' in FIG. 1.
Figure 5:
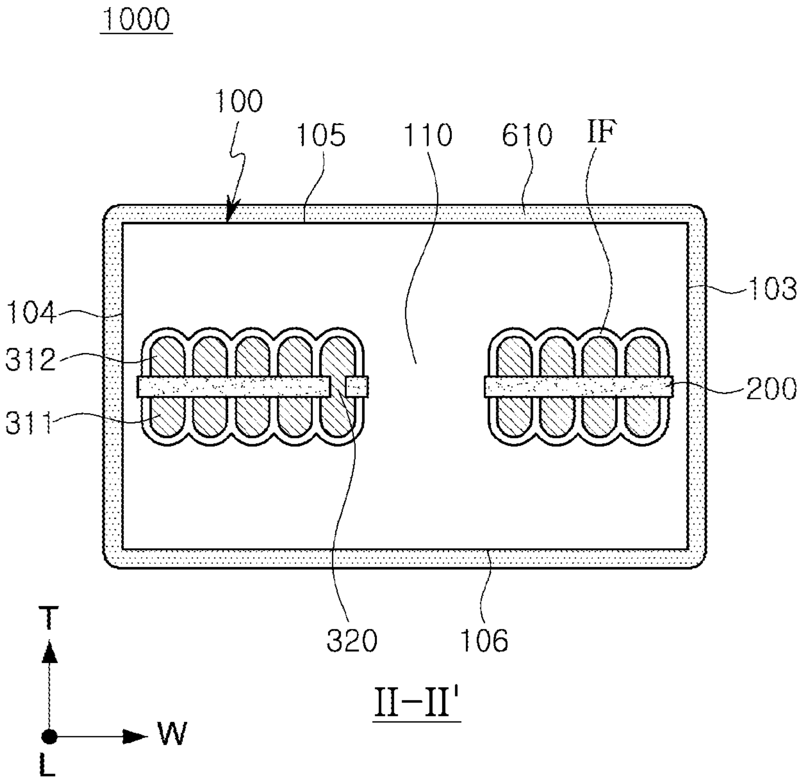
FIG. 5 is a cross-sectional view taken along line II-II' in FIG. 1.

FIG. 1 is a schematic view of a coil component according to an example embodiment of the present disclosure. FIG. 2 is a view when viewed in direction A of FIG. 1. FIG. 3 is a view when viewed in direction B of FIG. 1. FIG. 4 is a cross-sectional view taken along line I-I' in FIG. 1. FIG. 5 is a cross-sectional view taken along line II-II' in FIG. 1. In FIG. 3, a second insulating layer 620 is omitted for understanding of the present disclosure and ease of description.

Referring to FIGS. 1 to 5, a coil component 1000 according to an example embodiment includes a body 100, a support substrate 200, a coil portion 300, external electrodes 400 and 500, a first insulating layer 610, and a second insulating layer 620.

The body 100 may form an exterior of the coil component 1000 and may embed the coil portion 300 therein.

The body 100 may be formed to have a hexahedral shape overall.

Hereinafter, an example embodiment will be described on the assumption that the body 100 has a hexahedral shape. However, such description does not exclude a coil component, including a body formed to have a shape other than the hexahedral shape, from the scope of this embodiment.

The body 100 has a first surface 101 and a second surface 102 opposing each other in a length direction L, a third surface 103 and a fourth surface 104 opposing each other in a width direction W, and a fifth surface 105 and a sixth surface 106 opposing each other in a thickness direction T. Each of the first to fourth surfaces 101, 102, 103, and 104 of the body 100 may correspond to a wall surface of the body 100 connecting the fifth surface 105 and the sixth surface 106 of the body 100. Hereinafter, both end surfaces (one end surface and the other end surface) of the body 100 may refer to the first surface 101 and the second surface 102 of the body 100, respectively, and both side surfaces (one side surface and the other side surface) of the body 100 may refer to the third surface 103 and the fourth surface 104 of the body 100, respectively. In addition, one surface and the other surface of the body 100 may refer to the sixth surface 106 and the fifth surface 105 of the body 100, respectively. When the coil component 1000 according to an example embodiment is mounted on a mounting board such as a printed circuit board (PCB), or the like, the one surface 106 of the body 100 is disposed to face a mounting surface of the mounting board to be mounted on the mounting board.

The body 100 may be formed such that the coil component 1000, including the external electrodes 400 and 500 to be described later, has a length of 2.0 mm, a width of 1.2 mm, and a thickness of 0.65 mm, but is not limited thereto. Values of the length, width, and thickness of the coil component 100 exclude a tolerance, and actual length, width and thickness of the coil component 1000 may be different from the above values due to the tolerance.

The body 100 may include a magnetic material and a resin. Specifically, the body 100 may be formed by laminating one or more magnetic composite sheets including an insulating the magnetic material dispersed in the resin. However, the body 100 may have a structure other than the structure in which the magnetic material dispersed in the resin. For example, the body 100 may be formed of a magnetic material, such as ferrite, and may be formed of a non-magnetic material.

Examples of ferrite powder particles may be at least one or more of spinel type ferrites such as Mg—Zn-based ferrite, Mn—Zn-based ferrite, Mn—Mg-based ferrite, Cu—Zn-based ferrite, Mg—Mn—Sr-based ferrite, Ni—Zn-based ferrite, and the like, hexagonal ferrites such as Ba—Zn-based ferrite, Ba—Mg-based ferrite, Ba—Ni-based ferrite, Ba—Co-based ferrite, Ba—Ni—Co-based ferrite, and the like, garnet type ferrites such as Y-based ferrite, and the like, and Li-based ferrites.

Magnetic metal powder particle may include one or more selected from the group consisting of iron (Fe), silicon (Si), chromium (Cr), cobalt (Co), molybdenum (Mo), aluminum (Al), niobium (Nb), copper (Cu), and nickel (Ni). For example, the magnetic metal powder particle may be at least one or more of a pure iron powder, a Fe—Si-based alloy powder, a Fe—Si—Al-based alloy powder, a Fe—Ni-based alloy powder, a Fe—Ni—Mo-based alloy powder, a Fe—Ni—Mo—Cu-based alloy powder, a Fe—Co-based alloy powder, a Fe—Ni—Co-based alloy powder, a Fe—Cr-based alloy powder, a Fe—Cr—Si-based alloy powder, a Fe—Si—Cu—Nb-based alloy powder, a Fe—Ni—Cr-based alloy powder, and a Fe—Cr—Al-based alloy powder.

The magnetic metal powder particles may be amorphous or crystalline. For example, the magnetic metal powder particles may be Fe—Si—B—Cr-based amorphous alloy powder particles but are not limited thereto.

Each of the ferrite powder particles and the magnetic metal powder particles may have an average diameter of about 0.1 μm to about 30 μm but is not limited thereto.

The body 100 may include two or more types of magnetic powder particles dispersed in an insulating resin. In this case, the term "different types of magnetic material" means that magnetic materials, dispersed in the resin, are distinguished from each other by one of diameter, composition, crystallinity, and shape.

The resin may include an epoxy, a polyimide, a liquid crystal polymer, or the like, in a single form or in combined forms, but is not limited thereto.

The body 100 may include a core 110 penetrating through the coil portion 300 to be described later. The core 110 may be formed by filling a through-hole of the coil portion 300 with the magnetic composite sheet, but a method of forming the core 110 is not limited thereto.

The support substrate 200 may be embedded in the body 100 and may support the coil portion 300 to be described later.

The support substrate 200 may include an insulating material, for example, a thermosetting insulating resin such as an epoxy resin, a thermoplastic insulating resin such as polyimide, or a photosensitive insulating resin, or the support substrate 200 may include an insulating material in which a reinforcing material such as a glass fiber or an inorganic filler is impregnated with an insulating resin. For example, the support substrate 200 may include an insulating material such as prepreg, Ajinomoto Build-up Film (ABF), FR-4, a bismaleimide triazine (BT) film, a photoimageable dielectric (PID) film, and the like, but are not limited thereto.

The inorganic filler may be at least one or more selected from the group consisting of silica ($SiO_2$), alumina ($Al_2O_3$), silicon carbide (SiC), barium sulfate ($BaSO_4$), talc, mud, a mica powder, aluminum hydroxide ($Al(OH)_3$), magnesium hydroxide ($Mg(OH)_2$), calcium carbonate ($CaCO_3$), magnesium carbonate ($MgCO_3$), magnesium oxide (MgO), boron nitride (BN), aluminum borate ($AlBO_3$), barium titanate ($BaTiO_3$), and calcium zirconate ($CaZrO_3$).

When the support substrate 200 is formed of an insulating material including a reinforcing material, the support substrate 200 may provide better rigidity. When the support substrate 200 is formed of an insulating material not containing glass fibers, the support substrate 200 may be advantageous in thinning the overall component. When the support substrate 200 is formed of an insulating material containing a photosensitive insulating resin, the number of processes of forming the coil portion 300 may be reduced. Therefore, it may be advantageous in reducing production costs, and a fine via may be formed.

The coil portion 300 may be disposed on the support substrate 200. The coil portion 300 may be embedded in the body 100 to exhibit characteristics of the coil component 1000. For example, when the coil component 1000 is used as a power inductor, the coil portion 300 may serve to stabilize the power supply of an electronic device by storing an electrical field as a magnetic field and maintaining an output voltage.

The coil portion 300 is formed on at least one of the surfaces of the support substrate 200, opposing each other, and forms at least one turn. The coil portion 300 is disposed on one surface and the other surface of the support substrate 200, opposing each other in the thickness direction T of the body 100. In this embodiment, the coil portion 300 includes a first coil pattern 311 and a first lead-out portion 331 disposed on one surface of the support substrate 200 opposing the sixth surface 106 of the body 100, a second coil pattern 312 and a second lead-out portion 332 disposed on the other surface of the support substrate 200, and a via 320 connecting the first coil pattern 311 and the second coil pattern 312 through the support substrate 200. As a result, the coil portion 300 applied to this embodiment may be formed of a single coil generating a magnetic field in the thickness direction T of the body 100 based on the core 110.

Each of the coil patterns 311 and 312 may be in a planar spiral shape having at least one turn formed about the core 110. As an example, based on the directions of FIGS. 2, 4, and 5, the first coil pattern 311 may form at least one turn about the core 110 on a lower surface of the support substrate 200. The second coil pattern 312 forms at least one turn about the core 110 on an upper surface of the support substrate 200.

The lead-out portions 331 and 332 are connected to the coil patterns 311 and 312 and are exposed to the first and second surfaces 101 and 102 of the body, respectively. Specifically, the first lead-out portion 331 is disposed on one surface of the support substrate 200 to be connected to the coil pattern 311 and to be exposed to the first surface 101 of the body 100. The second lead-out portion 332 is disposed on the other surface of the support substrate 200 to be connected to the second coil pattern 312 and to be exposed to the second surface 102 of the body 100. The lead-out portions 331 and 332 are respectively exposed to the first and second surfaces 101 and 102 of the body 100 to be in contact with and respectively connected to the external electrodes 400 and 500 to be described later.

At least one of the coil patterns 311 and 312, the via 320, and the lead-out patterns 331 and 332 may include at least one conductive layer.

As an example, when the second coil pattern 312, the via 320, and the second lead-out pattern 332 are formed by a plating process, each of the second coil pattern 312, the via 320, and the second lead-out pattern 332 may include a seed layer, formed by vapor deposition such as electroless plating or sputtering, and an electroplating layer. The electroplating layer may have a single-layer structure or a multilayer structure. The electroplating layer having the multilayer structure may have a conformal structure in which one electroplating layer covers the other electroplating layer or may have a form in which the other electroplating layer is laminated on only one surface of the one electroplating layer. The seed layers of the second coil pattern 312, the via 320, and the second lead-out pattern 332 may be integrated with each other, and thus, there may be no boundary therebetween, but are not limited thereto. The electroplating layers of the second coil pattern 312, the via 320, and the second lead-out pattern 332 may be integrated with each other, and thus, there may no boundary therebetween, but are not limited thereto.

As another example, the coil portion 300 may be formed by separately forming the first coil pattern 311 and the second coil pattern 312 and laminating the first coil pattern 311 and the second coil pattern 312 on the support substrate 200 in a batch. In this case, the via 320 may include a high-melting-point metal layer and a low-melting-point metal layer having a melting point lower than a melting point of the high-melting-point metal layer. The low-melting-point metal layer may be formed of a solder including lead (Pb) and/or tin (Sn). At least a portion of the low-melting-point metal layer may be melted due to a pressure and a temperature during the batch lamination. For this reason, an intermetallic compound layer (IMC layer) may be formed on at least a portion of a boundary between the low-melting-point metal layer and the second coil pattern 312.

As an example, the coil patterns 311 and 312 may be formed to protrude from lower and upper surfaces of the support substrate 200, respectively. As another example, the first coil pattern 311 may be embedded in the lower surface of the support substrate 200 to expose a lower surface of first coil pattern 311 to the lower surface of the support substrate 200, and the second coil pattern 312 may be formed to protrude upwardly of the upper surface of the support substrate 200. In this case, a concave portion may be formed on the lower surface of the first coil pattern 311, so that the lower surface of the support substrate 200 and the lower surface of the first coil pattern 311 may not be located on the same plane. As another example, the first coil pattern 311 may be embedded in the lower surface of the support substrate 200 to expose a lower surface of the first coil pattern 311 to the lower surface of the support substrate 200, and the second coil pattern 312 may be embedded in the upper surface of the support substrate 200 to expose an upper surface of the second coil pattern 312 to the upper surface of the support substrate 200.

Each of the coil patterns 311 and 312, the via 320, and the lead-out patterns 331 and 332 may be formed of a conductive material such as copper (Cu), aluminum (Al), silver (Ag), tin (Sn), gold (Au), nickel (Ni), lead (Pb), titanium (Ti), molybdenum (Mo), chromium (Cr), or alloys thereof, but the conductive material is not limited thereto.

An insulating film IF is formed along the surfaces of the support substrate 200 and the coil portion 300. The insulating film IF may be provided to protect the coil portion 300 and to insulate the coil portion 300 from the body 100 including conductive powder particles and may include a known insulating material such as parylene. Any insulating material included in the insulating film IF may be used but is not necessarily limited. The insulating film IF may be formed by vapor deposition or the like, but is not limited thereto, and may also be formed by laminating an insulating film on both sides of the support substrate 200.

The first insulating layer 610 surrounds all of the first to sixth surfaces 101, 102, 103, 104, 105, and 106 of the body 100, and openings in which the external electrodes 400 and 500 are to be formed, are formed in the first insulating layer 610. For example, the first insulating layer 610 is formed to surround an entire surface of the body 100 together with the external electrodes 400 and 500. On the other hand, the first insulating layer 610 disposed on each of the first and second surfaces 101 and 102 of the body 100 has one region and the other region spaced apart from each other in a width direction W by a slit in which connection portions 411 and 511 of the external electrodes 400 and 500 are disposed. This will be described later.

The first insulating layer 610 may function as a plating resist when the external electrodes 400 and 500 are formed by plating, but the function of the first insulating layer 600 is not limited thereto.

The first insulating layer 610 may include a thermoplastic resin such as a polystyrene-based resin, a vinyl acetate-based resin, a polyester-based resin, a polyethylene-based resin, a polypropylene-based resin, a polyamide-based resin, a rubber-based resin, an acrylic-based resin, a thermosetting resin such as a phenol-based resin, an epoxy-based resin, a urethane-based resin, a melamine-based resin, and an alkyd-based resin, a photosensitive resin, parylene, SiOx, or SiNx.

The first insulating layer 610 may have an adhesive function. For example, when an insulating film is laminated on the body 100 to form the first insulating layer 610, the insulating film including an adhesive element may adhere to the surface of the body 100. In this case, an adhesive layer may be additionally formed on one surface of the first insulating layer 610. However, an additional adhesive layer may not be formed on one surface of the first insulating layer 610 in the case, in which the first insulating layer 610 is formed using a semi-cured (B-stage) insulating film, or the like.

The first insulating layer 610 may be formed by applying a liquid insulating resin to a surface of the body 100, laminating an insulating film on a surface of the body 100, or forming an insulating resin on a surface of the body using vapor deposition. The insulating film may be a dry film (DF) including a photosensitive insulating resin, an Ajinomoto Build-up Film (ABF), a polyimide film, or the like.

The first insulating layer 610 may be formed to have a thickness range of 10 nm to 100 μm. When the first insulating layer 610 has a thickness less than 10 nm, characteristics of the coil components, such as a Q factor, a breakdown voltage, a self-resonant frequency (SRF), and the like, may be reduced. When the first insulating layer 610 has a thickness greater than 100 μm, overall length, width, and thickness of the coil component are increased to be disadvantageous for thinning.

In one example, the thickness of the first insulating layer 610 may refer to a distance from one point of a line segment corresponding to one surface of the first insulating layer 610 contacting to a surface of the body 100 (for example, a surface of the first insulating layer 610 contacting to the fourth surface 104 of the body 100 in FIG. 5) to the other point at which a normal contacts a line segment corresponding to the other surface of the first insulating layer 610 opposing one surface of the first insulating layer 610, when the normal extends from one point to the other point in the width direction W, based on an optical micrograph of a width-thickness cross-section (a WT cross-section) in the central portion of the body 100 in the length direction L.

Alternatively, based on an optical micrograph of a width-thickness cross-section (a WT cross-section) in the central portion of the body 100 in the length direction L, the thickness of the first insulating layer 610 may indicate, when normals respectively extend from a plurality of one points of a line segment corresponding to one surface of the first insulating layer 610 contacting to a surface of the body 100 (for example, a surface of the first insulating layer 610 contacting the fourth surface 104 of the body 100 in FIG. 5), an arithmetic mean of distances from the plurality of one points to a plurality of the other points at which the plurality of normals are in contact with a line segment corresponding to the other surface of the first insulating layer 610 opposing one surface of the first insulating layer 610.

The external electrodes 400 and 500 are disposed on the first and second surfaces 101 and 102 of the body 100 to be connected to the coil portion 300 and are disposed on the sixth surface 106 of the body 100 to be spaced apart from each other.

The external electrodes 400 and 500 include a first external electrode 400, disposed to be in contact with the first lead-out pattern 331, and a second external electrode 500 disposed to be in contact with the second lead-out pattern 332. The first external electrode 400 includes a first connection portion 411, disposed on the first surface 101 of the body 100 to be in contact with and connected to the first lead-out pattern 331, and a first extension portion 412 extending from the connection portion 411 to the sixth surface 106 of the body 100. The second external electrode 500 includes a second connection portion 511, disposed on the second surface 102 of the body 100 to be connected to the second lead-out pattern 332, and a second extension portion 512 extending from the second connection portion 511 to the sixth surface 106 of the body 100. The first extension portion 412 of the first external electrode 400 and the second extension portion 512 of the second external electrode 500 are spaced apart from each other on the sixth surface 106 of the body 100 such that they are not in contact with each other.

The external electrodes 400 and 500 may be formed on the surface of the body 100 by performing electroplating using the first insulating layer 610, formed on the surface of the body 100, as a plating resist. When the body 100 includes magnetic metal powder particles, the magnetic metal powder particles may be exposed to the surface of the body 100. Due to the magnetic metal powder particles exposed to the surface of the body 100, conductivity may be provided to the surface of the body 100 during electroplating, and the external electrodes 400 and 500 may be formed on the surface of the body 100 by electroplating.

The connection portions 411 and 511 and the extension portions 412 and 512 of the external electrodes 400 and 500 may be formed by the same plating process, so that no boundary may be formed therebetween. For example, the first connection portion 411 and the first extension portion 412 may be integrated with each other, and the second connection portion 511 and the second extension portion 512 may be integrated with each other. In addition, the connection portions 411 and 511 and the extension portions 412 and 512 may be formed of the same metal. However, this description does not intend to exclude a case, in which the connection portions 411 and 511 and the extension portions 412 and 512 are formed by different plating processes to form boundaries therebetween, from the scope of the present disclosure.

The external electrodes 400 and 500 may be formed of a conductive material such as copper (Cu), aluminum (Al), silver (Ag), tin (Sn), gold (Au), nickel (Ni), lead (Pb), titanium (Ti), or alloys thereof, but a material thereof is not limited thereto.

The external electrodes 400 and 500 may be formed to have a thickness range of 0.5 μm to 100 μm. When each of the external electrodes 400 and 500 has a thickness less than 0.5 μm, a board may be detached and peeled off during mounting of the board. When each of the external electrodes has a thickness greater than 100 μm, it may be disadvantageous for thinning of the coil components.

The second insulating layer 620 is disposed on each of the first and second surfaces 101 and 102 of the body 100 to cover the first insulating layer 610, disposed on the first and second surfaces 101 and 102, and the connection portions 411 and 511 of the first and second external electrodes 400 and 500. The second insulating layer 620 may cover the connection portions 411 and 511 of the first and second external electrodes 400 and 500 to prevent the coil component 1000 from being short-circuited to another electronic component, adjacent and mounted, when the coil component 1000 is mounted on a mounting board such as a printed circuit board (PCB) or the like.

The second insulating layer 620 may include a thermoplastic resin such as a polystyrene-based resin, a vinyl acetate-based resin, a polyester-based resin, a polyethylene-based resin, a polypropylene-based resin, a polyamide-based resin, a rubber-based resin, an acrylic-based resin, a thermosetting resin such as a phenol-based resin, an epoxy-based resin, a urethane-based resin, a melamine-based resin, and an alkyd-based resin, a photosensitive resin, parylene, SiOx, or SiNx.

The second insulating layer 620 may have an adhesive function. For example, when an insulating film is laminated on the body 100 to form the second insulating layer 620, the insulating film including an adhesive element may adhere to the surface of the body 100. In this case, an adhesive layer may be additionally formed on one surface of the second insulating layer 620. However, an additional adhesive layer may not be formed on one surface of the second insulating layer 620 in the case, in which the second insulating layer 620 is formed using a semi-cured (B-stage) insulating film, or the like.

The second insulating layer 620 may be formed by applying a liquid insulating resin to a surface of the body 100, laminating an insulating film on a surface of the body 100, or forming an insulating resin on a surface of the body using vapor deposition. The insulating film may be a dry film (DF) including a photosensitive insulating resin, an Ajinomoto Build-up Film (ABF), a polyimide film, or the like.

The second insulating layer 620 may be formed to have a thickness range of 10 nm to 100 μm. When the second insulating layer 620 has a thickness less than 10 nm, characteristics of the coil components, such as a Q factor, a breakdown voltage, a self-resonant frequency (SRF), and the like, may be reduced. When the second insulating layer 620 has a thickness greater than 100 μm, overall length, width, and thickness of the coil component are increased to be disadvantageous for thinning.

In on example, the thickness of the second insulating layer 620 may refer to a distance from one point of a line segment corresponding to one surface of second insulating layer 620 contacting to the connection portions 411 and 511 to the other point at which a normal contacts a line segment corresponding to the other surface of second insulating layer 620 opposing one surface of second insulating layer 620, when the normal extends from one point to the other point in the length direction L, based on an optical micrograph of a length-thickness cross-section (an LT cross-section) in the central portion of the body 100 in the width direction W.

Alternatively, based on an optical micrograph of a length-thickness cross-section (an LT cross-section) in the central portion of the body 100 in the width direction W, the thickness of the second insulating layer 620 may indicate, when normals respectively extend from a plurality of one points of a line segment corresponding to one surface of second insulating layer 620 contacting to the connection portions 411 and 511, an arithmetic mean of distances from the plurality of one points to a plurality of the other points at which the plurality of normals are in contact with a line segment corresponding to the other surface of second insulating layer 620 opposing one surface of second insulating layer 620.

Hereinafter, a location relationship between the first insulating layer 610 and the first external electrode 400, based on the first surface 101 of the body 100, will be described. However, this description may be equivalently applied to the first insulating layer 610 and the second external electrode 500 disposed on the second surface 102 of the body 100.

Referring to FIG. 3, the first insulating layer 610 is disposed on the first surface 101 of the body 100, and has one region 610A and the other region 610B spaced apart from each other in a width direction W perpendicular to a thickness direction T. For example, the first insulating layer 610 is first formed on the entire first surface 101 of the body 100, and a slit having a shape extending in the thickness direction T of the first insulating layer 610 is then formed to expose a portion of the first surface 101 of the body 100. Thus, the one region 610A and the other region 610B of the first insulating layer 610 may be spaced apart from each other. The slit is formed in the first insulating layer 610 by physical and/or chemical processing to exposes the first lead-out portion 331. The first connection portion 411 of the first external electrode 400 is formed on the first surface 101 of the body 100 exposed to the slit to be disposed between the one region 610A and the other region 610B of the first insulating layer 610 and to be in contact with and connected to the first lead-out pattern 331.

A ratio of a dimension (length) W3 of the first connection portion 411 in the width direction W to the sum of a dimension (length) W1 of one region 610A of the first insulating layer 610 in the width direction, a dimension (length) W2 of the other region 610B of the first insulating layer 610 in the width direction W, and the dimension W3 of the connection portion 411 in the width direction W, W3/(W1+W2+W3), satisfies 0.5 or more and 0.917 or less. When the ratio is less than 0.5, the dimension W3 of the first connection portion 411 in the width direction W is significantly small, and thus, connectivity between the first lead-out pattern 331 and the first external electrode 400 may be deteriorated. When the ratio is greater than 0.917, plating bleeding may occur, and thus, the first external electrode 400 may be formed up to an edge of the first surface of the body 100 in which the first insulating layer 610 is formed.

In one example, the dimension (length) W1 of one region 610A of the first insulating layer 610 in the width direction W may refer to a distance from one point of a line segment corresponding to one surface of one region 610A of the first insulating layer 610 contacting to the first connection portion 411 to the other point at which a normal contacts a line segment corresponding to the other surface of one region 610A of the first insulating layer 610 opposing one surface of one region 610A of the first insulating layer 610, when the normal extends from one point to the other point in the width direction W, based on an optical micrograph of the coil component 1000 in the B direction of FIG. 1 after removing the second insulating layer 620. The dimension (length) W2 of the other region 610B of the first insulating layer 610 in the width direction W and the dimension W3 of the connection portion 411 in the width direction W may be determined similarly.

Alternatively, based on an optical micrograph of the coil component 1000 in the B direction of FIG. 1 after removing the second insulating layer 620, the dimension (length) W1 of one region 610A of the first insulating layer 610 in the width direction W may indicate, when normals respectively extend from a plurality of one points of a line segment corresponding to one surface of one region 610A of the first insulating layer 610 contacting to the first connection portion 411, an arithmetic mean of distances from the plurality of one points to a plurality of the other points at which the plurality of normals are in contact with a line segment corresponding to the other surface of one region 610A of the first insulating layer 610 opposing one surface of one region 610A of the first insulating layer 610. The dimension (length) W2 of the other region 610B of the first insulating layer 610 in the width direction W and the dimension W3 of the connection portion 411 in the width direction W may be determined similarly.

The dimensions W1 and W2 of the one region 610A and the other region 610B of the first insulating layer 610 in the width direction W may be the same, or substantially the same in consideration of an error, margin, or tolerance occurred in manufacturing and/or measurement. In this case, the first connection portion 411 may be disposed in the center of the first surface 101 of the body 100 in the width direction to improve the connectivity between the first lead-out pattern 331 and the first external electrode 400.

The dimension W1 of the one region 610A of the first insulating layer 610 in the width direction W may be 50 μm or more and 300 μm or less. When the dimension W1 of the one region 610A of the first insulating layer 610 in the width direction W is less than 50 μm, plating bleeding may occur, and thus, the first external electrode 400 may be formed up to an edge of the first surface 101 of the body 100 in which the first insulating 610 is formed. When the dimension W1 of the one region 610A of the first insulating layer 610 in the width direction W is greater than 300 μm, connectivity between the first lead-out pattern 331 and the first external electrode 400 may be deteriorated.

The dimension W3 of the first connection portion 411 in the width direction W may be 600 μm or more and 1100 μm or less. When the dimension W3 of the first connection portion 411 in the width direction W is less than 600 μm, connectivity between the first lead-out pattern 331 and the first external electrode 400 may be deteriorated. When the dimension W3 of the first connection portion 411 in the width direction W is greater than 1100 μm, plating bleeding occurs, and thus, the first external electrode 400 may be formed up to an edge of the first surface 101 of the body 100 in which the first insulating layer 610 is formed.

Table 1 shows a plating bleeding rate and a poor connectivity rate obtained by performing experiments while changing the dimensions W1 and W3 of the one region 610A and the first connection portion 411 of the first insulating layer 610 in the width direction W on the first surface of the body 100. In each of the experiments 1 to 9, the dimensions W1 and W3 of the one region 610A and the first connection portion 411 of the first insulating layer 610 in the width direction W were the same. The other conditions, other than the above conditions, were equivalently applied to all of the experiments 1 to 9.

TABLE 1

| | W1 (μm) | W3 (μm) | W1/(W1 + W2 + W3) | Plating Bleeding Rate (%) | Poor Connectivity Rate (%) |
|---|---|---|---|---|---|
| 1 | 20 | 1160 | 0.967 | 75 | 0 |
| 2 | 35 | 1130 | 0.942 | 52 | 0 |
| 3 | 50 | 1100 | 0.917 | 1.5 | 0 |

TABLE 1-continued

| | W1 (μm) | W3 (μm) | W1/(W1 + W2 + W3) | Plating Bleeding Rate (%) | Poor Connectivity Rate (%) |
|---|---|---|---|---|---|
| 4 | 100 | 1000 | 0.833 | 1.4 | 0 |
| 5 | 200 | 800 | 0.667 | 1.4 | 0 |
| 6 | 300 | 600 | 0.500 | 1.5 | 0 |
| 7 | 350 | 500 | 0.417 | 1.5 | 9 |
| 8 | 400 | 400 | 0.333 | 1.2 | 26 |
| 9 | 500 | 200 | 0.167 | 1.4 | 76 |

As shown in Table 1, when W1/(W1+W2+W3) satisfies 0.5 or more and 0.917 or less, connection between the coil portion 300 and the first external electrode 400 may be secured while reducing plating bleeding.

For example, in the case of the experiments 7 to 9 in which W1/(W1+W2+W3) was less than 0.5, the plating bleeding rate is reduced, but the connectivity between the coil portion 300 and the first external electrode 400 is deteriorated. In the case of experiments 1 and 2 in which W1/(W1+W2+W3) was greater than 0.917, the connectivity was not problematic, but the plating bleeding rate was increased.

Figure 6:
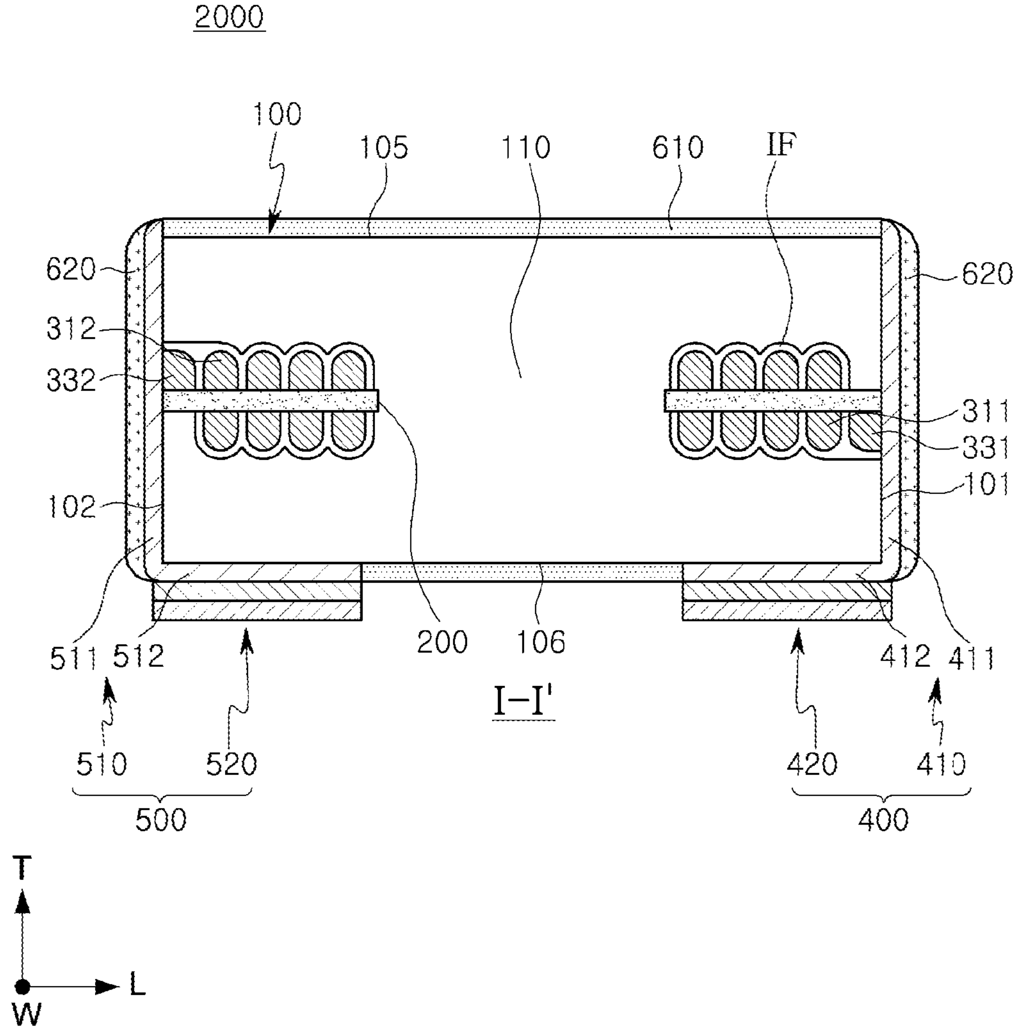
FIG. 6 is a schematic view of a coil component according to another example embodiment of the present disclosure, and is a view corresponding to a cross section taken along line I-I' in FIG. 1.

FIG. 6 is a schematic view of a coil component according to another example embodiment of the present disclosure and is a view corresponding to a cross section taken along line I-I' in FIG. 1.

When comparing FIG. 6 with FIGS. 1 to 5, a coil component 2000 according to this embodiment is different the coil component 1000 according to one embodiment in external electrodes 400 and 500. Therefore, this embodiment will be described while focusing on only the external electrodes 400 and 500 different from those of one embodiment.

The external electrodes 400 and 500 further include plating layers 420 and 520, respectively disposed on extension portions 412 and 512. Specifically, the first external electrode 400 includes a first metal layer 410, including a first connection portion 411 and a first extension portion 412, and a first plating layer 420 disposed on the first extension portion 412. The second external electrode 500 includes a second metal layer 510, including a second connection portion 511 and a second extension portion 512, and a second plating layer 520 disposed on the second extension portion 512. The plating layers 510 and 520 may include a plurality of layers. For example, as illustrated in FIG. 6, each of the plating layers 420 and 520 may include a plurality of layers. In this case, each of the plating layers 420 and 520 may have a double layer structure in which a nickel (Ni) plating layer is disposed on the extensions 412 and 512 and a tin (Sn) plating layer is disposed on the nickel (Ni) plating layer, but a structure thereof is not limited thereto.

As described above, plating bleeding of an external electrode may be reduced while maintaining connectivity between a coil portion and the external electrode.

While example embodiments have been shown and described above, it will be apparent to those skilled in the art that modifications and variations could be made without departing from the scope of the present disclosure as defined by the appended claims.

What is claimed is:

1. A coil component comprising:

a body in which a support substrate is embedded;

a coil portion disposed on the support substrate and including a first lead-out pattern and a second lead-out pattern respectively exposed from one end surface and the other end surface of the body, opposing each other;

a first insulating layer, disposed on each of the one end surface and the other end surface of the body, having first and second slits in a thickness direction of the body to respectively expose the first lead-out pattern and the second lead-out pattern;

a first external electrode including a connection portion disposed in the first slit to connect to the first lead-out pattern; and a second external electrode including a connection portion disposed in the second slit to connect to the second lead-out pattern, wherein a ratio of a dimension of the connection portion in a width direction of the body to a dimension of the first insulating layer in the width direction of the body satisfies 0.5 or more and 0.917 or less.

2. The coil component of claim 1, wherein the first and second slits are formed at the center of the first insulating layer along the width direction of the body.

3. The coil component of claim 1, wherein a dimension of the first and second slits in the width direction is 600 micrometers or more and 1100 micrometers or less.

4. The coil component of claim 1, the first external electrode further includes an extension portion extending from the connection portion to one surface of the body, and the second external electrode further includes an extension portion extending from the connection portion to the one surface of the body.

5. The coil component of claim 4, wherein the connection portion and the extension portion include the same material.

6. The coil component of claim 5, wherein the connection portion and extension portion are integrated with each other.

7. The coil component of claim 4, wherein the first and second external electrode further includes a plating layer disposed on the extension portion.

* * * * *